(No Model.)
R. L. H. PYBASS.
BEER COOLER.
No. 248,500. Patented Oct. 18, 1881.
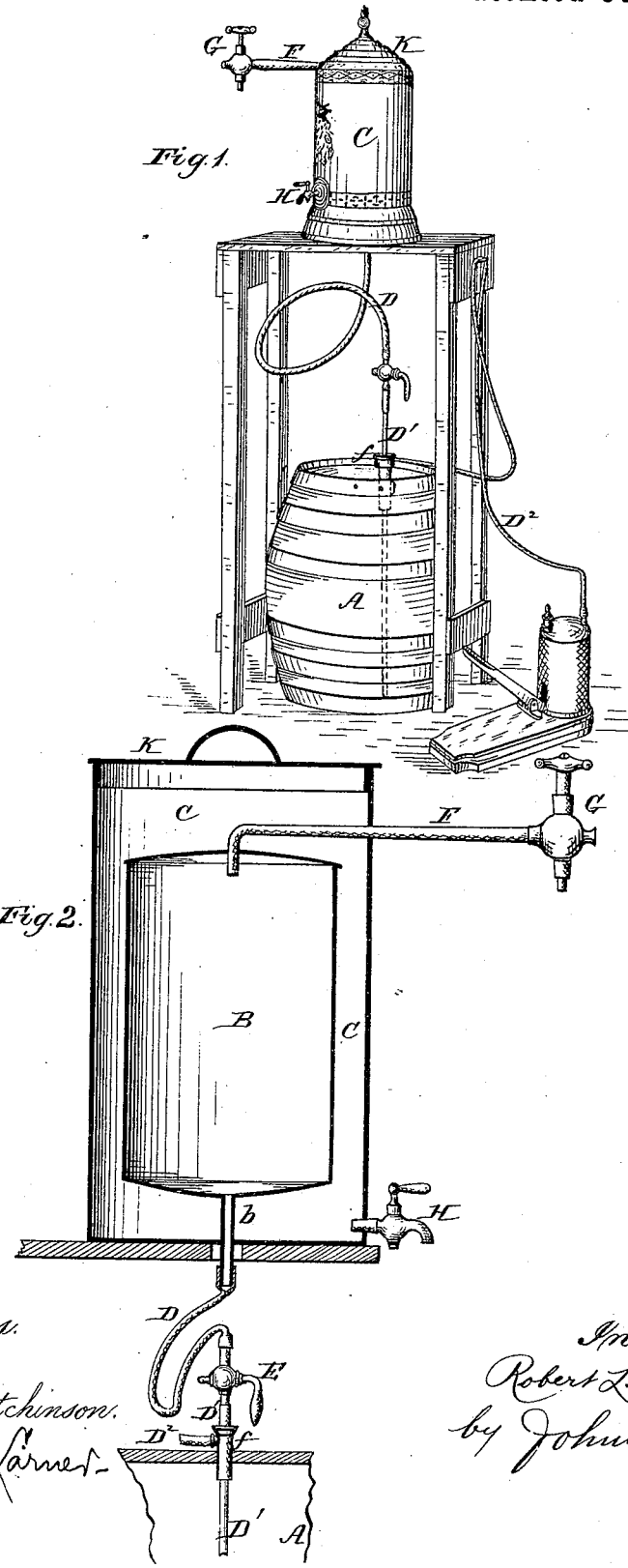

UNITED STATES PATENT OFFICE.

ROBERT L. H. PYBASS, OF TRENTON, TENNESSEE.

BEER-COOLER.

SPECIFICATION forming part of Letters Patent No. 248,500, dated October 18, 1881.

Application filed July 25, 1881. (No model.)

*To all whom it may concern:*

Be it known that I, ROBERT LUTHER HARDIN PYBASS, a citizen of the United States, residing at Trenton, in the county of Gibson and State of Tennessee, have invented new and useful Improvements in Beer-Coolers, of which the following is a specification.

My invention relates to improvements in beer and other liquid coolers in which the liquid is drawn from the keg into a secondary receptacle surrounded by a chamber containing ice.

The object of my special improvement is to produce a cooling attachment for receiving a certain quantity of beer from the keg to be cooled for use, and to force out and save all the beer in the keg, so that there shall be no waste—that is, I provide means by which the cooler, placed above the keg, serves to hold the last of the beer forced into it by air-pressure from the keg, and to transfer the last of the beer from one keg to the fresh-tapped keg, such transfer being effected by merely putting the cooler in communication with the fresh-tapped keg, whereby the beer remaining in the cooler from one keg flows out into the next keg, unless such saving of the beer from an empty keg should not be desired. I obtain these objects by means of the apparatus shown in the accompanying drawings, in which—

Figure 1 represents the cooling attachment as applied to a keg in connection with an air-pump; and Fig. 2, an enlarged vertical section of my improved cooling attachment, showing its keg-connections.

In these drawings, A represents the keg; B, the receptacle for the beer drawn from the keg to be cooled for use, and C the ice-chamber surrounding said receptacle.

Extending downward from the bottom of the beer-receptacle B is a tube, $b$, which connects by means of a flexible hose of rubber or other material, D, with the keg-faucet or tapping-pipe, so that the cooler-vessel proper may not be disturbed in its position when a new keg is to be tapped. The tapping or draft pipe D' enters the keg and extends nearly to the bottom thereof. The beer from the keg passes into the receptacle through this pipe, while the cooled beer in the receptacle is drawn off for use through the pipe F and its cock G under the air-pressure in the keg. Water from the ice-chamber C is drawn by the cock H. A suitable removable cover, K, caps the ice-chamber, which is kept filled with ice.

I use an air-pump to force the beer into the receptacle, preferably of the form shown, and connected by a hose, $D^2$, with a packed bung-tap, $f$, having a cork stopper for tapping, and through which the draft-pipe is forced, as in what is known in the "Pride of the West Faucet and Pump." The pump-hose $D^2$ connects with this bung-tap in a well-known manner to force the beer into the receptacle when the draft-pipe cock E is open. The function of this cock is to hold the last of the beer forced from the keg in the cooler, and thus allow the keg to be emptied and the beer so held in the cooler as the last of one keg is caused to flow into and be used with the beer of the fresh-tapped keg, and so on as each keg is emptied and another tapped, thus effecting a great saving of beer by transferring the last of one keg into or as a part of the fresh beer of the keg next tapped. As the beer in the keg runs to the last it is pumped up into the cooler B and there held by the cock E until the next keg is tapped, when, by opening the said cock, the beer in the cooler and the beer in the keg is commingled.

It will be understood that the draft-pipe D' is provided with this cut-off cock at a point outside of the packed tap $f$, and that said pipe is forced through the tap and pushes out the cork which is placed in the inner end of said tap as is used with the pump-faucet shown. The flexible hose-connection D is made with the draft-pipe outside of the cut-off cock E, so that said pipe can be withdrawn from one and inserted in another keg without disturbing the connection with the cooler. As the beer is drawn the last of the keg becomes flat from the loss of the expansive power of its gases, and this causes much waste, while the transfer of such flat beer into beer highly charged with gas is not objectionable to the consumer.

The cooler has a capacity from a half to a gallon, and can be placed upon a stand or counter and connected with the end or side of the keg, so that the latter may be rolled or upset into position beneath the cooler, and the tapping and connection conveniently made.

The draft-pipe provided with a cock and its air-pump connections are not new, and a draft-cooler has been used in connection with the keg to receive and cool the beer drawn therefrom; but in such apparatus no provision has been made by which the last of the beer in the keg is pumped into the cooling-receptacle and held therein during the operation of tapping a fresh keg, and then making the last of the beer of one keg form a part of the beer of the fresh-tapped keg, and thus save all the beer. This is an important advantage, which it is not possible to obtain in the apparatus heretofore made.

The draft-pipe cock, as heretofore used with the air-pump, is to serve the beer; but in its combination with the flexible tube and the cooling-receptacle, with which it connects, such cock forms a cut-off to hold the beer in the cooler in tapping a fresh keg.

I claim—

1. In an apparatus for cooling liquids on draft, the combination of a cooling fountain or receptacle, B C, for the beer drawn from the keg, with the draft-pipe D', provided with the cock E, a flexible connection, D, for said draft-pipe, with the fountain B, and the air-pump connections, substantially as described.

2. In an apparatus for cooling liquids on draft, the cooler for the drawn beer, consisting of the closed receptacle B and the inclosing ice-chamber C, the former having a receiving-tube, b, for the beer passing through the bottom of said ice-chamber, and a discharge-tube, F, passing from the upper part of said chamber, in combination with the flexible tube D, the draft-pipe D', provided with the cock E and the air-pump connections, the said hose connecting said draft-pipe with the said closed beer-receptacle, whereby the last of the beer in the keg is held in the closed receptacle while tapping a fresh keg without detaching the draft-tube connections with said cooler, and commingling the beer thus held in the cooler with the beer in the fresh-tapped keg.

In testimony whereof I have hereunto set my hand in the presence of two subscribing witnesses.

ROBERT L. H. PYBASS.

Witnesses:
L. H. TYREE,
C. A. HILL.